United States Patent [19] [11] 4,115,318
Speca [45] Sep. 19, 1978

[54] OLEFIN POLYMERIZATION CATALYST

[75] Inventor: Anthony N. Speca, Cincinnati, Ohio

[73] Assignee: National Petro Chemicals Corporation, New York, N.Y.

[21] Appl. No.: 805,191

[22] Filed: Jun. 9, 1977

[51] Int. Cl.$^2$ ............................................. C08F 4/78
[52] U.S. Cl. ................................... 252/428; 252/430; 252/431 P; 526/129; 526/134; 526/154; 526/161; 526/192
[58] Field of Search ...................... 252/428, 430, 431 P

[56] References Cited

U.S. PATENT DOCUMENTS

| 3,704,287 | 11/1972 | Johnson | 252/431 P X |
| 3,907,849 | 9/1975 | Meyer | 252/431 P X |
| 3,984,351 | 10/1976 | Rekers et al. | 252/430 |
| 3,985,676 | 10/1976 | Rekers et al. | 252/430 X |

*Primary Examiner*—Patrick P. Garvin
*Attorney, Agent, or Firm*—Kenneth D. Tremain

[57] ABSTRACT

An olefin polymerization catalyst is prepared by depositing a poly (di-$\mu$-dihydrocarbylphosphinatohydroxyaquochromium (III)) compound or the corresponding anhydrous compound upon an inorganic support material and calcining the impregnated support material in a non-reducing atmosphere above 300° C. up to the decomposition temperature of the support material to provide an activated catalyst. The catalyst exhibits high productivity and produces polymers having high melt indices.

16 Claims, No Drawings

OLEFIN POLYMERIZATION CATALYST

BACKGROUND OF THE INVENTION

1. Field of the Invention

This invention relates to the field of olefin polymerization catalysts, and more particularly, to supported catalysts impregnated with chromium (III) compounds.

2. Description of the Prior Art

Numerous olefin polymerization catalysts are known which utilize a chromium (III) compound in their preparation. The low pressure, high molecular weight olefin polymerization process of U.S. Pat. No. 3,008,943 employs the reaction product of an alcoholate, benzoate or acetylacetonate of chromium with titanium tetrachloride. The unsupported olefin polymerization catalyst of U.S. Pat. No. 3,152,105 is thought to be a reaction product of water, a chromous or chromic carboxylic acid salt and an alkylaluminum hydride. U.S. Pat. No. 3,311,596 describes the polymerization of olefins using as catalyst, chromium (III) acetylacetonate. The olefin polymerization catalyst of U.S. Pat. No. 3,349,067 is prepared by oxidizing a chromium-containing compound such as chromium (III) acetylacetonate which has been deposited on a carrier to at least partly decompose the compound to chromium oxide wherein at least part of the chromium is in the hexavalent state. According to U.S. Pat. No. 3,392,162, an olefin polymerization catalyst is prepared by milling an organoalkali metal compound such as butyllithium or sodium aluminum dodecyl in a suitable medium, e.g., diesel oil, with a chromium (III) compound such as chromium (III) acetylacetonate or chromium (III) bromide. U.S. Pat. No. 3,622,522 describes an olefin polymerization catalyst prepared from an organogallium and/or organo-tin compound, a chromium (III) compound such as chromium (III) dodecoxide or chromyl (III) methylcyclopentoxide, and a titanium-containing compound. U.S. Pat. No. 3,950,303 describes the preparation of filled polyolefins by reacting an olefin in the presence of a filler upon which there is deposited a chromium (III) compound such as: a $C_1$ to $C_{12}$ ester of chromium, e.g., chromium acetate, chromium oxalate, chromium octoate and chromium sulfate; $[Cr(NH_3)_5Cl]Cl_2$; $[Cr(NH_3)_6]Cl_3$; hexaurea chromium (III) fluorosilicates $[Cr(CON_2H_4)_6]_2 \cdot (SiF_6)_3 \cdot 3H_2O$; fumarato-chromium (III) nitrates; methacrylato-chromium hydroxide; and, methacrylatochromium chloride. The supported chromium (III) compound olefin polymerization catalyst of U.S. Pat. No. 3,953,413, e.g., chromium (III) acetylacetonate on silica, is activated by heating at about 850°–2000° F. in a non-oxidizing atmosphere. U.S. Pat. No. 3,959,178 describes a mixed olefin polymerization catalyst in which two portions of a support impregnated with a chromium (III) compound, for example, chromium (III) acetylacetonate, are each activated at temperatures which are at least 200° F. apart, with the combined activated portions thereafter being treated with a hydroxycarbyl aluminum hydrocarbyloxide. The mixed olefin polymerization catalyst of U.S. Pat. No. 3,998,996 is prepared by reacting a chromium (III) compound containing water of crystallization such as a hydrated chromium (III) halide, sulfate or carboxylate, with a metal alcoholate and mixing the resulting complex with an activator.

None of the aforementioned patents disclose or suggest an olefinpolymerization catalyst prepared with a chromium (III) polymer as hereinafter fully described.

SUMMARY OF THE INVENTION

It has been discovered that alpha-olefins can be polymerized at high levels of productivity (measured as grams of polyolefin produced per gram of catalyst) to provide polyolefins of desirably high melt index employing as catalyst, a supported hydrated or anhydrous polymeric chromium (III) compound activated by heating in a nonreducing atmosphere.

According to this invention, an olefin polymerization catalyst is prepared by depositing a poly (di-$\mu$-dihydrocarbylphosphinatohydroxyaquochromium (III) ) compound or the corresponding anhydrous compound upon an inorganic support material and calcining the impregnated support material in a non-reducing atmosphere above 300° C. up to the decomposition temperature of the support material to provide an activated catalyst.

The terms "polymer" and "polymeric" as used herein in connection with the chromium (III) catalyst components contemplate the dimers, oligomers and higher polymers of said components.

The terms "olefin" and "alpha-olefin" as used herein refer to the monomers which can be polymerized with the supported polymeric chromium (III) catalysts of this invention and include alpha-olefins with 2 to 10 carbon atoms and 1 or 2 ethylenic linkages such as ethylene, propylene, n-butylene-1, isobutylene, alpha-methylstyrene, 2-,3- or 4-methylstyrene, butadiene-1,3, isoprene, 2-phenylbutadiene-1,3 and 2, 3-dimethylbutadiene-1,3. It is also within the scope of this invention to copolymerize the aforesaid alpha-olefins with minor amounts up to 50% by weight of other ethylenically unsaturated monomeric polymerizable compounds. Suitable comonomers are: halogenated styrene; styrenesulfonic acid; alpha,beta-unsaturated carboxylic acids such as acrylic acid and methacrylic acid; esters of acrylic acid with alcohols of from 1 to 8 carbon atoms such as methyl acrylate, ethyl acrylate and n-butyl acrylate; esters of methacrylic acid with alcohols of from 1 to 8 carbon atoms such as methyl methacrylate and tertiary butyl acrylate; vinyl esters of alcohols with 1 to 10 carbon atoms such as vinyl acetate, vinyl propionate and vinyl benzoate; vinyl ethers of alcohols with 1 to 4 carbon atoms such as vinyl methyl ether and vinyl n-butyl ether; vinyl chloride; vinylidene chloride; nitriles and amides of alpha, beta-unsaturated carboxylic acids such as acrylonitrile and methacrylo-nitrile; acrylamides; methacrylamide vinyl ketones with 4 to 7 carbon atoms such as methyl vinyl ketones and isopropenyl vinyl ketone; N-vinyl compounds such as vinylpyrrolidone, vinyl caprolactam, vinylimidazole and vinyl carbazole; fumaric acid, maleic acid, maleic anhydrate, maleic imide; esters of maleic acid with 1 to 6 carbon atoms such as diethyl maleate, dimethyl maleate, di-n-butyl maleate and the corresponding esters of fumaric acid.

DESCRIPTION OF THE PREFERRED EMBODIMENTS

The inorganic support materials which are useful in the present invention include those normally employed in supported chromium catalysts used in olefin polymerizations such as those described in U.S. Pat. No. 2,825,721. Typically, these support materials are inorganic oxides of silica, alumina, silica-alumina mixtures, thoria, zirconia and comparable oxides which are porous and have a medium surface area. Preferred support materials are silica xerogels or xerogels containing silica as the major constituent. Especially preferred are the silica xerogels disclosed and claimed in U.S. Pat. Nos. 3,652,214, 3,652,215 and 3,632,216 which are incorporated by reference herein. These silica xerogels have a surface area in the range of 200 to 500m$^2$/g, a pore volume greater than about 2.0 cc/g, a major portion of the pore volume being provided by pores having diameters in the range of 300 to 600 A.

Preparative methods for the hydrated polymeric chromium (III) compounds herein are disclosed in Maguire et al., *J. Polymer Sci.*, Part A-1, Vol. 6, 1397–1408 (1968), and Nanneli et al., *J. Polymer Sci.*, Part A-1, Vol. 9, 3027–3038 (1971). Each of the aforecited publications is incorporated herein by reference. The preparation of the dehydrated polymeric chromium (III) compounds is disclosed in Nanneli et al., ibid.

According to Maguire et al., a chromium (II) diphosphinate such as chromium (II) diphenylphosphinate is oxidized by air in the presence of water to yield a poly (di-μ-diphosphinato-hydroxyaquochromium (III)) compound. The chromium (II) phosphinates in this reaction are themselves obtained from the reaction of a chromium (II) salt, numerous ones of which are known in the art, with an alkali metal phosphinate. The alkali metal phosphinates, preferably sodium and potassium phosphinates, are in turn prepared by neutralizing a phosphinic acid with an alkali metal hydroxide or carbonate. Among the many phosphinic acids which can be used in the preparation of the aforesaid alkali metal phosphinates and which are prepared by way of any one of several known and conventional methods are included dimethyl phosphinic, diethylphosphinic, dipropylphosphinic, diisopropylphosphinic, dibutylphosphinic, dioctylphosphinic, methylethylphosphinic, methylpropylphosphinic, methylisopropylphosphinic, ethylcyclohexylphosphinic, dicyclohexylphosphinic, diphenylphosphinic, phenylpyridylphosphinic, dinaphthylphosphinic, and like acids.

The simpler, and therefore preferred, procedure for obtaining the hydrated polymeric chromium (III) compounds is disclosed in Nanneli et al. and is carried out by reacting a soluble chromium (III) salt such as $CrCl_3.H_2O$ or $Cr(NO_3)_3.9H_2O$ with an alkali metal diphosphinate and an alkali metal hydroxide or carbonate in a suitable medium such as water - tetrahydrofuran (THF). Especially preferred are the sodium and potassium alkali metal diphosphinates, hydroxides and carbonates. The alkali metal diphosphinate used in this reaction can be preformed or formed in situ from the precursor phosphinic acid neutralized with the requisite amount of alkali metal hydroxide or carbonate. The same phosphinic acids recited, supra, can also be for the preparation of the alkali metal diphosphinates of this preferred method.

An alternate and equally preferred method for preparing the hydrated polymeric chromium (III) compounds herein as described by Nanneli et al. calls for the reaction of chromium (III) hydroxide with a phosphinic acid in solvent, e.g., water — THF. The same phosphinic acids recited supra can also be used in the reaction of this alternate and preferred method.

The corresponding anhydrous polymeric chromium (III) compounds are readily obtained by drying the hydrated parent compounds under vacuum at ambient temperature or at elevated temperatures which are below the decomposition temperatures of the parent compounds. Complete dehydration is indicated when no further change in weight of the composition being dried is observed. Dehydration can also be accomplished by azeotropic distillation. Dehydration need not be complete in which case some water of hydration will remain in the parent hydrated polymeric chromium (III) compounds.

The number of monomeric units in both the hydrated and the anhydrous polymeric chromium (III) compounds can be from 2 to about 350, depending on the duration of aging in solution at room or elevated temperature, with this number preferably being from 2 to about 40. The number of monomeric units in both compounds may also be increased in the presence of other compounds. For example, either the hydrated or anhydrous polymeric chromium (III) compound can be heat aged in chloroform in the presence of poly(di-μ-diphenylphosphinatotitanium dichloride). It is preferable that the polymeric chromium (III) compound contain at least one cycloalkyl group of 5 or more carbon atoms or an aryl group since polymeric chromium (III) compounds containing these groups are less viscous than the equivalent polymeric compounds containing alkyl groups.

It is also within the scope of this invention to deposit an aluminum compound upon the inorganic support material, in addition to the polymeric chromium (III) compound. Examples of such aluminum alkoxides include aluminum secbutoxide, aluminum ethoxide and aluminum isopropoxide with aluminum sec-butoxide being preferred.

The catalysts of the present invention can be prepared by depositing a hydrated or anhydrous polymeric chromium (III) compound, or a mixture thereof, with or without the co-deposition of an aluminum alkoxide compound, on an inorganic support material such as previously described. Deposition of the aforesaid compounds can be carried out in a known or conventional manner as, for example, by vapor coating or by impregnating the support with solutions of the compounds in suitable inert solvents which are preferably anhydrous organic solvents. Such organic solvents include aliphatic, cycloalkyl and alkaryl hydrocarbons and their halogenated derivatives. A preferred organic solvent is dichloromethane. It is preferred that the aforesaid solutions be used as freshly prepared so that the number of units corresponds to the range previously outlined. The polymeric chromium (III) compound can be applied to the support first or the aluminum compound can be applied first or the polymeric chromium (III) compound and aluminum compound can be applied together. It is preferred, however, to first impregnate the support with the polymeric chromium (III) compound and thereafter impregnate the support with the aluminum compound.

The most effective catalysts have been found to be those containing the polymeric chromium (III) compound in an amount such that the amount of chromium by weight based on the weight of the support is from about 0.25% to about 2.5% and preferably is from about 0.5% to about 1.25%, although amounts outside these ranges still provide operable catalysts. If employed, the aluminum compound should be added in sufficient amounts to provide from about 0.1% to about 10% of aluminum by weight based on the weight of the support and preferably from about 0.5% to about 5.5% although other amounts outside these ranges can be used to prepare operable catalysts.

After the polymeric chromium (III) compound and, optionally, the aluminum compound have been deposited on the inorganic support, the support is calcined, i.e. heated, in a non-reducing atmosphere, preferably in an oxygen containing atmosphere, at a temperature above about 300° C. up to the decomposition temperature of the support. Typically, the supported compositions are calcined at a temperature of from about 800° C. to about 1000° C.. The calcination period can widely vary depending on the calcination temperatures employed and can be from about ½ hour to about 50 hours or more. Generally, calcination is carried out over a period of from about 2 to about 12 hours with approximately 4 to 6 hours being typical. The non-reducing atmosphere, which is preferably air or other oxygen-containing gas, should be dry and preferably should be dehumidified down to a few parts per million (ppm) of water to obtain maximum catalyst activity. Typically, air used in the procedure described in this application is dried to less than 2-3 ppm of water.

The calcined supported polymeric chromium (III) catalysts of the present invention can, if desired, be used in combination with known and conventional metallic and/or non-metallic olefin polymerization catalyst components. Thus, for example, the following metallic reducing agents can be used herein: trialkyl aluminums, such as triethyl aluminum, triisobutyl aluminum; alkyl aluminum halides; alkyl aluminum alkoxides; dialkyl zinc; dialkyl magnesium; metal borohydrides including those of the alkali metals, especially sodium, lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane. The foregoing metallic and non-metallic compounds can be combined with the polymeric chromium (III) supported catalysts herein prior to being fed to an olefin polymerization reactor or these two components can be fed separately to an olefin polymerization reactor.

In proportioning the amount of metallic or non-metallic compound to the amount of polymeric chromium (III) compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% chromium by weight of the support, the parameters set forth below are representative. The atomic ratios are based upon a calculation of the metal in the metallic reducing agent and/or the non-metal in the non-metallic reducing agent versus the chromium content present in the polymeric chromium (III) compound on the support.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ration of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratios are from about 0.1/1 to 20/1, and in terms of weight are from about 0.4% to about 75% by weight.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the catalyst compositions of this invention are amenable to use with conventional polymerization processes for olefins, in particular alphaolefins having 2 to 10 carbon atoms and are suitable for polymerization effected under temperature and pressure conditions generally employed in the art, e.g., temperatures of from about 40° to about 200° C. and preferably from about 70° to 110° C., and pressures of from 200 to 1000 psig and preferably from 300 to 800 psig, as are used in slurry or particle form polymerizations.

A series of olefin polymerizations, the results of which are reported below, were carried out to demonstrate the ability of the novel catalyst systems of the present invention to produce polymers having enhanced physical properties such as increased melt indices. The polymerizations were carried out in a stirred autoclave using isobutane as a diluent. The supported polymeric chromium (III) compound and aluminum compound where used, and the reducing agent where used, is added along with the isobutane solvent to a stirred one gallon autoclave. The contents of the stirred autoclave are then heated to the polymerization temperature, i.e., 88° to 108° C. Hydrogen is added and then the ethylene is added to give 10 mole% in the liquid phase at which time the total pressure will be from about 425 to 575 psig. Polymerization begins almost immediately as noted by the ethylene coming from the ethylene demand supply system to the reactor. After approximately one hour of polymerization, the reaction is terminated by dropping the reactor contents into a pressure let-down system. The melt index (MI) and the high load melt index (HLMI) of the polymers prepared were determined using ASTM D-1238-65T (conditions E and F respectively).

The catalysts used in the polymerization runs of Tables I-VI below were prepared in accordance with the following Catalyst Preparation Procedure.

CATALYST PREPARATION PROCEDURE

A. The hydrated polymeric chromium (III) compound poly(di-$\mu$-diphenylphosphinatohydroxyaquochromium (III)) is prepared by adding a solution of NaOP($C_6H_5$)$_2$O (4.80g, 0.0200 mole) and $K_2CO_3$ (0.69g, 0.0050 mole) in 50 ml water with stirring to a solution of $CrCl_3 \cdot 6H_2O$ (2.66 g, 0.100 mole) in 50 ml THF (tetrahydrofuran). The reaction mixture was brought to boiling and the THF allowed to evaporate to provide a powered solid. After most of the THF had been removed, additional water (about 50 ml) was added, and the suspension was kept boiling until the precipitate could be easily ground with a spatula. The powdered solid was collected on a filter, thoroughly washed with water and dried in air to provide 5.2 g of poly(di-$\mu$-diphenylphosphinatohydroxyaquochromium (III)). A portion of the hydrated product was dried under vacuum at 200° C. to provide the corresponding anhydrous poly(di-$\mu$-diphenylphosphophinatohydroxychromium (III) compound.

B. Microspheroidal silica gel having a pore volume of about 2.5 cc/g prepared in accordance with U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A heat-aged dichloromethane solution of the hydrated polymeric chromium (III) compound prepared in step A is then added to the flask in sufficient quantity to provide a dry coated catalyst containing about 1% by weight of Cr based on weight of the support. The supernatant liquid is removed by filtration or distillation at reduced pressure and the coated gel is dried in a rotary evaporator at 60° C. and with 29 inches of Hg vacuum. In like manner, a dry coated catalyst support impregnated with the anhydrous polymeric chromium of step A in an amount sufficient to provide 1% Cr by weight of the support is also prepared.

C. As indicated, in some cases the catalyst was also coated with an aluminum alkoxide. In these cases, dichloromethane is added to a similar flask as used in step B and while maintaining a nitrogen atmosphere stirring is commenced (see U.S. Pat. No. 3,984,351 incorporated herein by reference). To the flask is added a portion of the supported hydrated polymeric chromium (III) of step B. A solution of dichloromethane and aluminum sec-butoxide is prepared in a pressure equalizing dropping funnel and the funnel attached to the stirred flask. The aluminum sec-butoxide solution is gradually added to the flask at the rate of 10 grams of solution per minute. After the addition of the solution is complete the slurry in the flask is stirred for about 1 hour. The supernatant liquid is removed by filtration or distillation at reduced pressure and the coated gel is dried in a rotary evaporator at temperatures up to about 60° C. and 29 inches Hg vacuum. The aluminum sec-butoxide was absorbed to provide about 3.7% aluminum by weight of the support (atomic ratio of aluminum to chromium of 8/1). Where indicated, a portion of the supported hydrated polymeric chromium (III) compound of step B was heat aged in chloroform in the presence of poly(di-$\mu$-diphenylphosphinatotitanium dichloride) with an atomic ratio of titanium to chromium of 1/1; and another portion of the supported anhydrous polymeric chromium (III) of step B was heat aged in chloroform in the presence of aluminum sec-butoxide (atomic ratio of aluminum to chromium of 4/1).

D. To heat activate the catalyst compositions prepared in steps B and C, the supported catalysts are each placed in a cylindrical container and fluidized with dry air at 0.20 feet per minute lineal velocity while being heated to a temperature of 900° C. and held at this temperature for 6 hours. The activated supported catalysts are recovered as powders.

A series of polymerizations of 10 mole % ethylene were carried out to illustrate the results from using the catalysts herein. The catalysts were those prepared in Catalyst Preparation Procedure above. Polymerizations were carried out at 90° C.. Hydrogen and triethyl boron (about 3/1 B/Cr atomic ratio) were added to the polymerization reactor. The results are set forth in the following Tables.

TABLE I

| EXAMPLE | CATALYST[1] | PRODUCTIVITY (gPE/g CATALYST/ HR.) | $H_2$ (PSI) | POLYETHYLENE (PE) POWDER PROPERTIES | | |
|---|---|---|---|---|---|---|
| | | | | MI | HLMI | HLMI/MI |
| 1 | A | 1185 | 30 | 0.19 | 15.96 | 84 |
| 2 | A | 755 | 120 | 0.29 | 22.91 | 79 |
| 3 | B | 835 | 30 | 15.5 | 1612 | 104 |
| 4 | B | 700 | 120 | 28 | N.M.[2] | — |
| 5 | A[1] | 817 | 30 | 0.2 | 23.8 | 119 |
| 6 | A[1] | 597 | 120 | 0.5 | 40 | 80 |
| 7 | B[1] | 480 | 30 | 2.7 | 145.8 | 54 |
| 8 | B[1] | 360 | 120 | 3.2 | 265.6 | 83 |
| 9 | C | 620 | 30 | 0.35 | 34.65 | 99 |
| 10 | C | 635 | 120 | 0.26 | 23.66 | 91 |
| 11 | D | 860 | 30 | 0.33 | 28.71 | 87 |
| 12 | D | 538 | 120 | 0.45 | 36 | 80 |
| 13 | D[1] | 642 | 30 | 0.24 | 30 | 125 |
| 14 | D[1] | 587 | 120 | 0.42 | 44.52 | 106 |
| 15 | D | 739 | 30 | 0.21 | 21.6 | 103 |
| 16 | D | 904 | 30 | 0.38 | 30.9 | 81.3 |
| 17 | D | 939 | 30 | 0.45 | 35.4 | 79 |
| 18 | D | 501 | 120 | 0.5 | 37.5 | 75 |
| 19 | D | 575 | 120 | 0.4 | 34.8 | 87 |
| 20 | E | 780 | 30 | 8.0 | 484 | 58 |
| 21 | E | 929 | 30 | 9.6 | 556 | 55 |
| 22 | E | 790 | 30 | 10.8 | 596 | 58 |
| 23 | A | 658 | 30 | 0.16 | 21.2 | 132.5 |
| 24 | A | 892 | 30 | 0.27 | 26.6 | 98.5 |
| 25 | A | 900 | 30 | 0.2 | 23.8 | 119 |
| 26 | A | 542 | 120 | 0.58 | 45.2 | 78 |
| 27 | A | 567 | 120 | 0.38 | 35.3 | 93 |
| 28 | A | 683 | 120 | 0.59 | 42.0 | 71 |
| 29 | B | 784 | 30 | 4.46 | N.M. | — |

TABLE I-continued

| EXAMPLE | CATALYST[1] | PRODUCTIVITY (gPE/g CATALYST/ HR.) | $H_2$ (PSI) | POLYETHYLENE (PE) POWDER PROPERTIES | | |
|---|---|---|---|---|---|---|
| | | | | MI | HLMI | HLMI/MI |
| 30 | B | 522 | 30 | 9.24 | 1142 | 124 |
| 31 | B | 319 | 30 | 10.4 | 936 | 90 |
| 32 | B | 275 | 120 | 10.2 | N.M. | — |
| 33 | B | 404 | 120 | 14.0 | N.M. | — |
| 34 | B | 438 | 120 | 17.2 | N.M. | — |

[1] A = Hydrated polymeric chromium (III) compound.
A[1] = Same as A, aged in chloroform.
B = Same as A but also with aluminum sec-butoxide.
B[1] = Same as B, aged in chloroform (Al/Cr = 4/1).
C = Same as A but also with poly(di-μ-diphenylphosphinatotitanium dichloride, aged in chloroform (Ti/Cr = 1/1).
D = Anhydrous polymeric compound (III) compound.
D[1] = Same as D, aged in chloroform.
E = Same as B but also with aluminum sec-butoxide.
[2] N.M. = No measurement possible.

Another series of support catalysts prepared in accordance with this invention were employed for the polymerization of a 10 mole % ethylene monomer concentration under the identical conditions except as noted. The results are set forth in the following Table.

TABLE II

| EXAMPLE | CATALYST[3] | PRODUCTIVITY gPE/g CATALYST/ HR. | gPE/g Cr/ HR. | H2 (PSI) | POLYETHYLENE (PE) POWDER PROPERTIES | | |
|---|---|---|---|---|---|---|---|
| | | | | | MI | HLMI | HLMI/MI |
| 35 | F | 574 | 63,778 | 30 | 0.24 | 18.6 | 77.5 |
| 36 | F[4] | 1120 | 124,443 | 30 | 0.18 | 15.0 | 83.3 |
| 37 | F | 870 | 96,666 | 30 | 0.21 | 17.4 | 82.8 |
| 38 | F[4] | 2170 | 241,109 | 30 | 0.15 | 13.2 | 88 |
| 39 | F | 580 | 64,444 | 120 | 0.33 | 25 | 75 |
| 40 | F | 644 | 71,555 | 120 | 0.24 | 19 | 80 |
| 41 | F | 1045 | 116,110 | 120 | 0.29 | 22 | 78 |
| 42 | G | 912 | 101,332 | 30 | 2.04 | 168 | 82.4 |
| 43 | G | 830 | 92,221 | 30 | 16.3 | 1351 | 82.9 |
| 44 | G | 850 | 94,444 | 30 | 5.8 | 567 | 97.1 |
| 45 | G | 754 | 83,777 | 30 | 14.8 | 1911 | 129 |
| 46 | G | 706 | 78,444 | 120 | 13.8 | 626 | 45 |
| 47 | G | 771 | 85,666 | 120 | 18.0 | 820 | 46 |
| 48 | G | 646 | 71,777 | 120 | 22.0 | 1300 | 59 |
| 49 | G | 763 | 84,777 | 120 | 10.0 | N.M. | — |

[3] F = Hydrated polymeric chromium (III) compound and 0.55 cc/g catalyst of triethyl boron (atomic ratio of B to Cr about 3:1).
G = Same as F but also with aluminum isobutoxide at 3.7% aluminum based on catalyst weight (atomic ratio of Al to Cr of about 8:1).
F[4] = These runs were carried out in a different reactor.
N.M. = No measurement possible.

As amply demonstrated by the results set forth in Tables I and II, the use of a polymeric chromium (III) compound in the preparation of a supported catalyst according to this invention provides catalysts giving excellent levels of productivity for the polymerization of alpha-olefins. Moreover, such catalysts promote the production of desirably high polymer melt indices.

What is claimed is:

1. A process for the preparation of an olefin polymerization catalyst which comprises:
   (a) depositing at least one polymeric chromium (III) compound upon an inorganic support material, said polymeric chromium (III) compound being at least one member of the group consisting of a poly(di-μ-dihydrocarbylphosphinatohydroxyaquochromium (III)) compound and the corresponding anhydrous compound, said polymeric chromium (III) compound containing from 2 to about 350 monomeric units; and
   (b) heating said support material having the polymeric chromium (III) compound deposited thereon in a non-reducing atmosphere above 300° C. up to the decomposition temperature of the support material.

2. The process of claim 1 wherein an aluminum alkoxide is also deposited upon the inorganic support material prior to the heating step.

3. The process of claim 2 wherein the aluminum alkoxide is aluminum sec-butoxide.

4. The process of claim 1 wherein the heat-treated polymerization catalyst is combined with a metallic or non-metallic reducing agent, the metallic reducing agent being selected from among the trialkyl aluminums, alkyl aluminum halides, alkyl aluminum alkoxides, dialkyl zinc, dialkyl magnesium, and the alkali metal and magnesium, beryllium and aluminum borohydrides, and the non-metallic reducing agent being selected from among the alkyl boranes and hydrides.

5. The process of claim 1 wherein the polymeric chromium (III) compound is selected from the group consisting of a poly(di-μ-diphenylphosphinatohydroxyaquochromium (III)) compound and the corresponding anhydrous compound.

6. The process of claim 1 wherein the polymeric chromium (III) compound contains from about 2 to about 40 monomeric units.

7. The process of claim 1 wherein the inorganic support material is a silica xerogel having a surface area in the range of 200 to 500 m²/g, a pore volume greater than about 2.0 cc/g and a major portion of the pore volume being provided by pores having diameters in the range of 300 to 600 A.

8. The process of claim 1 wherein the heating step is carried out in air at from about 800° C. to about 1000° C. for from about 4 to about 6 hours.

9. The process of claim 1 wherein poly(di-μ-diphenylphosphinatotitanium dichloride is deposited upon the inorganic support material prior to the heating step.

10. The olefin polymerization catalyst produced by the process of claim 1.

11. The olefin polymerization catalyst of claim 10 wherein an aluminum alkoxide is also deposited upon the inorganic support material.

12. The olefin polymerization catalyst of claim 11 wherein the aluminum alkoxide is aluminum sec-butoxide.

13. The olefin polymerization catalyst of claim 10 combined with a metallic or non-metallic reducing agent, the metallic reducing agent being selected from among the trialkyl aluminums, alkyl aluminum halides, alkyl aluminum alkoxides, dialkyl zinc, dialkyl magnesium, and the alkali metal and magnesium, beryllium and aluminum borohydrides, and the non-metallic reducing agent being selected from among the alkyl boranes and hydrides.

14. The olefin polymerization catalyst of claim 10 wherein the polymeric chromium (III) compound is selected from the group consisting of a poly(di-$\mu$-diphenylphosphinatohydroxyaquochromium (III)) compound and the corresponding anhydrous compound.

15. The olefin polymerization catalyst of claim 10 wherein the polymeric chromium (III) compound contains from about 2 to about 40 monomeric units.

16. The olefin polymerization catalyst of claim 10 wherein the inorganic support material is a silica xerogel having a surface area in the range of 200 to 500 $m^2/g$, a pore volume greater than about 2.0 cc/g and a major portion of the pore volume being provided by pores having diameters in the range of 300 to 600 A.

* * * * *